United States Patent
Yokoyama et al.

(10) Patent No.: US 10,057,444 B2
(45) Date of Patent: Aug. 21, 2018

(54) MOBILE TERMINAL, INFORMATION PROCESSING SYSTEM, AND CONTROL METHOD

(71) Applicant: CANON KABUSHIKI KAISHA, Tokyo (JP)

(72) Inventors: Toshihiro Yokoyama, Kawasaki (JP); Mitsuru Konji, Kawasaki (JP); Yuuki Wakabayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/474,218

(22) Filed: Mar. 30, 2017

(65) Prior Publication Data

US 2017/0310840 A1    Oct. 26, 2017

(30) Foreign Application Priority Data

Apr. 21, 2016    (JP) .................. 2016-085621

(51) Int. Cl.
*H04N 1/04* (2006.01)
*H04N 1/00* (2006.01)

(52) U.S. Cl.
CPC ..... *H04N 1/00803* (2013.01); *H04N 1/00278* (2013.01); *H04N 1/00588* (2013.01); *H04N 2201/0074* (2013.01); *H04N 2201/0081* (2013.01); *H04N 2201/0082* (2013.01)

(58) Field of Classification Search
CPC ........... H04N 1/00082; H04N 1/00307; H04N 1/2158; H04N 1/00084; H04N 1/00334; H04N 1/00962; H04N 1/32776; H04N 2201/0039; H04N 2201/0091;
(Continued)

(56) References Cited

U.S. PATENT DOCUMENTS

| | | | | |
|---|---|---|---|---|
| 8,054,479 B2* | 11/2011 | Sato | ................... | G03G 15/5004 358/1.13 |
| 9,342,766 B2* | 5/2016 | Nakano | .............. | G02B 27/2214 |
| 9,411,546 B2* | 8/2016 | Uchikawa | ............... | H04L 69/18 |

(Continued)

FOREIGN PATENT DOCUMENTS

JP        2014-131194 A    7/2014

*Primary Examiner* — Negussie Worku
(74) *Attorney, Agent, or Firm* — Carter, DeLuca, Farrell & Schmidt, LLP (57) ABSTRACT

In a technique to implement document reading by making use of a mobile terminal and an image forming apparatus, control to cause an image of a document to be captured at accurate timing is important. The present invention is a mobile terminal capable of communicating with an image forming apparatus and the mobile terminal includes: an image capturing unit; an instruction unit configured to transmit discharge instructions to discharge a document to the image forming apparatus in which the document is set in a sheet feed unit; a state acquisition unit configured to acquire a state of the image forming apparatus by communicating with the image forming apparatus; and an image capturing instruction unit configured to detect timing at which the image forming apparatus discharges the document based on the state of the image forming apparatus acquired by the state acquisition unit and to give instructions to capture an image of the document to the image capturing unit at the timing.

19 Claims, 8 Drawing Sheets

(58) Field of Classification Search
CPC ............. G06F 11/0733; G06F 11/0748; G06F 11/079; G06F 3/1203
See application file for complete search history.

(56) References Cited

U.S. PATENT DOCUMENTS

| | | | | |
|---|---|---|---|---|
| 9,485,371 | B2* | 11/2016 | Asai | H04N 1/0044 |
| 9,535,634 | B2* | 1/2017 | Takahira | G06F 3/1204 |
| 9,557,940 | B2* | 1/2017 | Shintani | G06F 3/1205 |
| 9,606,753 | B2* | 3/2017 | Itami | G06F 3/1205 |
| 9,645,777 | B2* | 5/2017 | Kikuchi | G06F 3/1226 |
| 9,690,523 | B2* | 6/2017 | Mihira | G06F 3/1226 |
| 9,701,135 | B2* | 7/2017 | Bae | B41J 11/0005 |
| 9,720,636 | B2* | 8/2017 | Kim | H04L 67/10 |
| 9,749,482 | B2* | 8/2017 | Kanbayashi | H04N 1/00344 |
| 2007/0188794 | A1* | 8/2007 | Matsui | B65H 5/00 |
| | | | | 358/1.15 |
| 2013/0077124 | A1* | 3/2013 | Vojak | H04N 1/00233 |
| | | | | 358/1.14 |
| 2013/0229690 | A1* | 9/2013 | Sumita | H04N 1/00127 |
| | | | | 358/1.15 |
| 2016/0065764 | A1* | 3/2016 | Kang | H04N 1/00 |
| | | | | 358/1.13 |
| 2016/0330431 | A1* | 11/2016 | Shim | H04N 1/00278 |
| 2017/0230537 | A1* | 8/2017 | Kawanishi | H04N 1/32776 |
| 2017/0322752 | A1* | 11/2017 | Miura | G06F 3/123 |
| 2018/0007219 | A1* | 1/2018 | Oyama | H04N 1/00411 |

* cited by examiner

```
<?xml version="1.0" encoding="utf-8"?>
<print>
    <numPages>1</numPages>

<width>1</width>
        <height>1</height>
        <color>bw</color>
      <bitDepth>8</bitDepth>
        <data>0x00</data>

</print>
```

FIG.7

```
<?xml version="1.0" encoding="utf-8"?>
<result>
    <response>ok</response>
    <status>printing_page</status>
    <job>1</job>
</result>
```

FIG.8

MOBILE TERMINAL, INFORMATION PROCESSING SYSTEM, AND CONTROL METHOD

BACKGROUND OF THE INVENTION

Field of the Invention

The present invention relates to a technique to implement document reading by making use of a mobile terminal and an image forming apparatus.

Description of the Related Art

In recent years, a scan function that reads a document, such as a paper document, and converts the read document into image data has spread. It is common for the scan function to be provided by an MFP (Multi Function Printer) including a pressing unit or an ADF (Automatic Document Feeder). However, at present, an SFP (Single Function Printer) including only a print function has also spread in a large number and the SFP cannot make use of the scan function. In such circumstances, a technique has been proposed, which implements the scan function in a pseudo manner in a printer not having the scan function (Japanese Patent Laid-Open No. 2014-131194). That is, after setting a document on which an image to be scanned is printed in a sheet feed unit of a printer, an image of the document discharged by the SFP is captured by continuously transmitting a blank sheet job that gives sheet feed instructions. As a result of this, reading of the image printed on the document is implemented. In the above-described technique, a camera is caused to perform image capturing for each document discharged continuously by the SFP, and therefore, the control to cause the camera to capture images of the documents at accurate timing is important.

SUMMARY OF THE INVENTION

Japanese Patent Laid-Open No. 2014-131194 describes a method of controlling image capturing timing of a document based on an appropriate interval from transmission of a blank sheet job until a camera is caused to perform image capturing, which is detected in advance and stored in a memory. However, in printing processing of a printer, a variety of unexpected events may occur, and therefore, with the method described in Japanese Patent Laid-Open No. 2014-131194, there is a case where it is not possible to capture an image of a document at accurate timing. For example, there is a case where it is not possible to capture an image of a document at accurate timing because cleaning processing or the like of the printer is performed during printing and sheet discharge is delayed.

The mobile device according to the present invention is a mobile terminal capable of communicating with an image forming apparatus and the mobile terminal includes: an image capturing unit; an instruction unit configured to transmit discharge instructions to discharge a document to the image forming apparatus in which the document is set in a sheet feed unit; a state acquisition unit configured to acquire a state of the image forming apparatus by communicating with the image forming apparatus; and an image capturing instruction unit configured to detect timing at which the image forming apparatus discharges the document based on the state of the image forming apparatus acquired by the state acquisition unit and to give instructions to capture an image of the document to the image capturing unit at the timing.

Further features of the present invention will become apparent from the following description of exemplary embodiments with reference to the attached drawings.

DESCRIPTION OF THE EMBODIMENTS

In the following, with reference to the drawings, an embodiment of the present invention is explained in detail.
(Embodiment)

In the present embodiment, explanation is given by taking an information processing system as an example, in which a scan is implemented by a mobile terminal detecting timing at which a printer discharges a document and capturing an image of the document after the mobile terminal transmits a blank sheet job to the printer.

Figure 1:
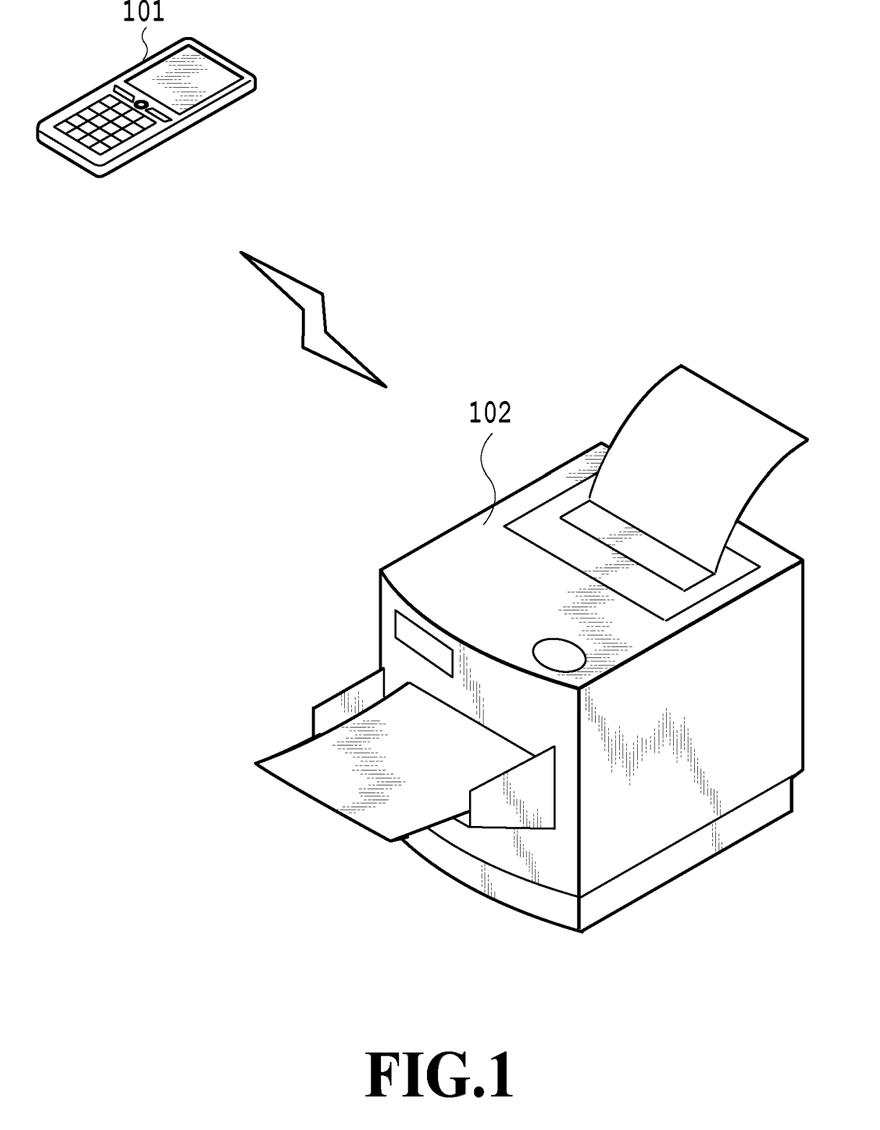
FIG. 1 is an outline diagram of an information processing system according to an embodiment.

FIG. 1 is an outline diagram of an information processing system according to the present embodiment. The information processing system includes a mobile terminal 101 and a printer 102 capable of communicating with the mobile terminal 101. The mobile terminal 101 is an information processing terminal having an image capturing function and as the mobile terminal 101, an image capturing device, such as a digital camera, may be used in addition to a mobile terminal, such as a smartphone and a tablet. The printer 102 is an image forming apparatus that performs printing on a fed printing medium and discharges the printing medium after printing one by one, and as the printer 102, an SFP (Single Function Printer) including only a print function may be used. It may also be possible for the information processing system of the present embodiment to further include a holding member configured to hold a mobile terminal at a position at which it is possible to capture an image of a printing medium discharged by the printer 102. In FIG. 1, the case is shown where the mobile terminal 101 and the printer 102 perform communication via direct wireless communication, but the case is not limited to this and it may also be possible to perform communication via, for example, a relay, such as a wireless LAN router. Alternatively, it may also be possible for the mobile terminal 101 and the printer 102 to perform communication via wired communication.

Figure 2:
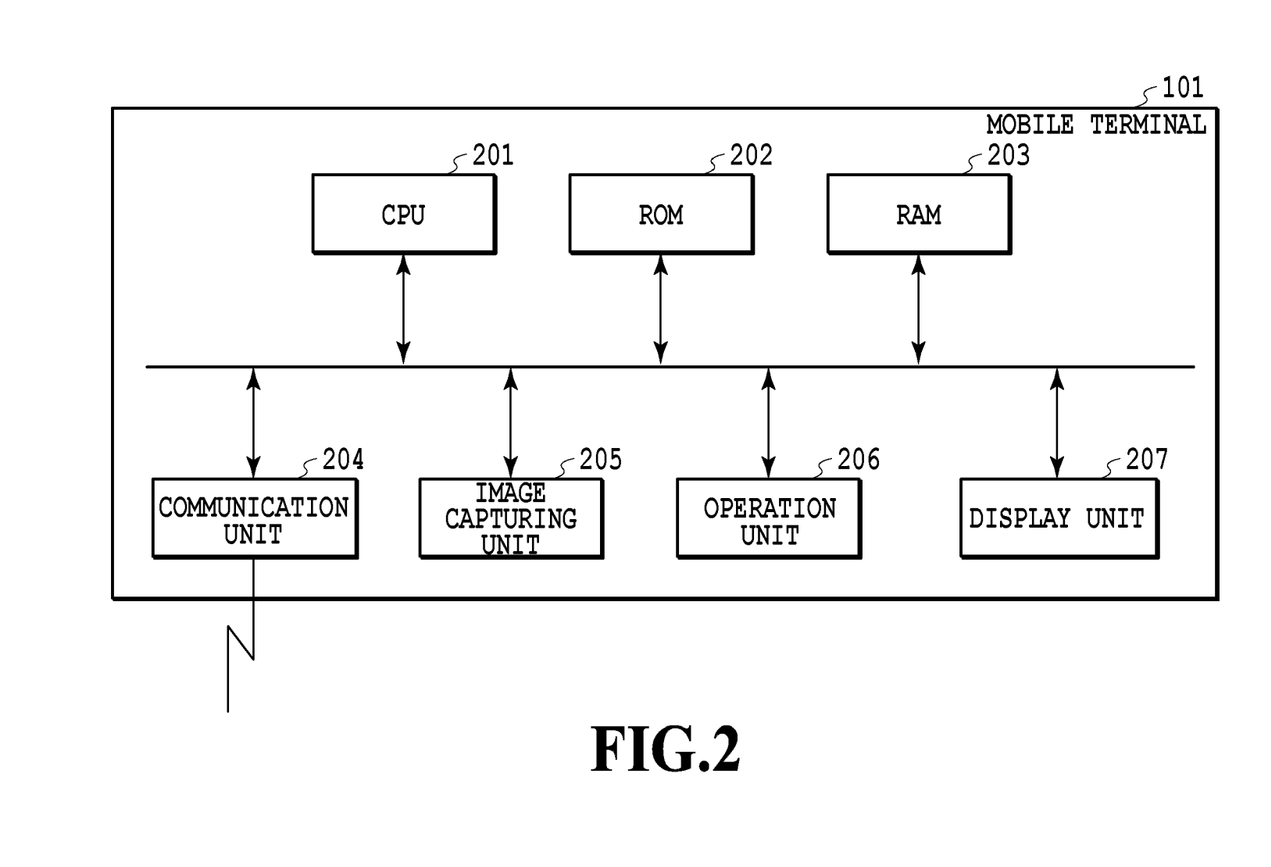
FIG. 2 is a block diagram showing a hardware configuration of a mobile terminal according to the embodiment.

FIG. 2 is a block diagram showing a hardware configuration of the mobile terminal 101 according to the present embodiment. A CPU 201 is a central processing unit configured to control the entire mobile terminal 101 and centralizedly controls a processing sequence of the mobile terminal 101. Programs and fixed data to implement a flowchart, to be described later, and image data generated at the time of a scan are stored in a ROM 202. A RAM 203 is used to temporarily store data and to read programs.

A communication unit 204 is in charge of direct communication with other devices, such as the printer 102, and communication via an access point. An image capturing unit 205 includes an image capturing element, such as a CMOS (Complementary Metal-Oxide-Semiconductor) image sensor, and a lens and generates image data by capturing an image of a document.

An operation unit 206 receives a button operation to the mobile terminal and an input from a user by a touch panel. A display unit 207 includes a display for display, such as an LCD (Liquid Crystal Display), and displays an image and text data in accordance with processing contents of the mobile terminal.

Figure 3A:
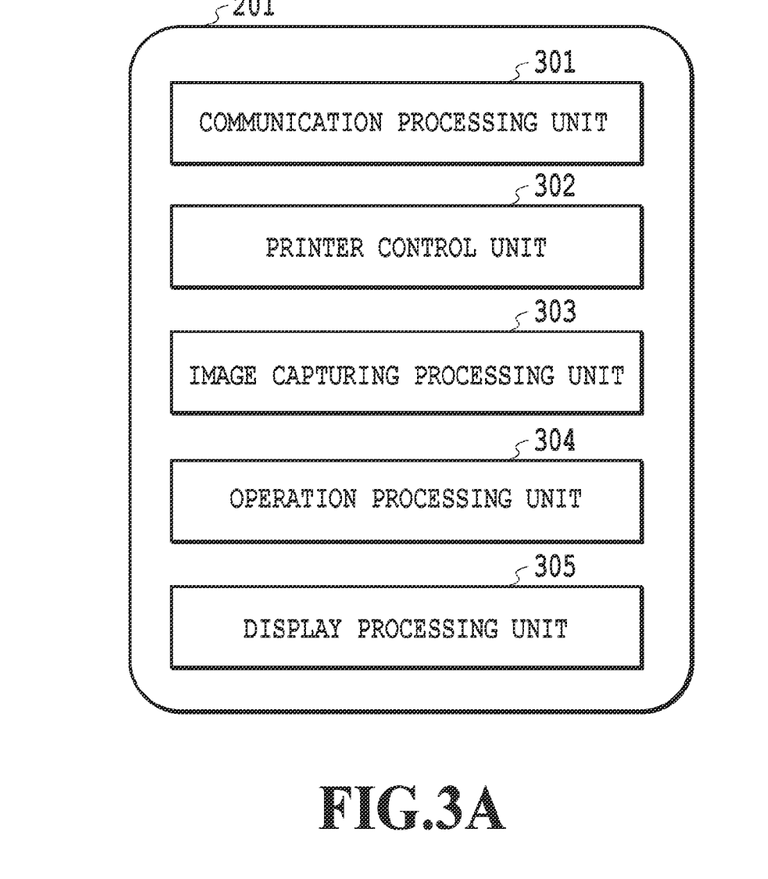
FIG. 3A and FIG. 3B are each a block diagram showing a function configuration of the mobile terminal according to the embodiment.

FIG. 3A is a block diagram showing a function configuration of the mobile terminal 101 according to the present embodiment. Each unit shown in FIG. 3A is implemented by the CPU 201 executing programs stored in the ROM 202.

A communication processing unit 301 implements communication with other devices, such as the printer 102, via the communication unit 204 by operating an IP address. As the communication method, for example, wireless communication, such as IEEE802.11, Wi-Fi Direct, Bluetooth (registered trademark), and Bluetooth Low Energy (registered trademark), can be used.

A printer control unit 302 controls the printer 102 via the communication processing unit 301 in accordance with a control protocol determined between the mobile terminal 101 and the printer 102. As a specific control protocol, for example, it is possible to perform transmission and reception of XML (Extensible Markup Language) data via a communication protocol, such as UDP (User Datagram Protocol). The control protocol is not limited to the above-described protocol and it may also be possible to perform transmission and reception of JSON (JavaScript Object Notation) data via, for example, the UDP protocol. It is possible for the mobile terminal 101 to perform printing control processing and state acquisition processing for the printer 102 by communicating with the printer 102 in accordance with a control protocol. In the case of detecting that the printer 102 has discharged a document by monitoring the state of the printer 102 periodically, the printer control unit 302 gives instructions to capture an image of the document to an image capturing processing unit 303.

Figure 3B:
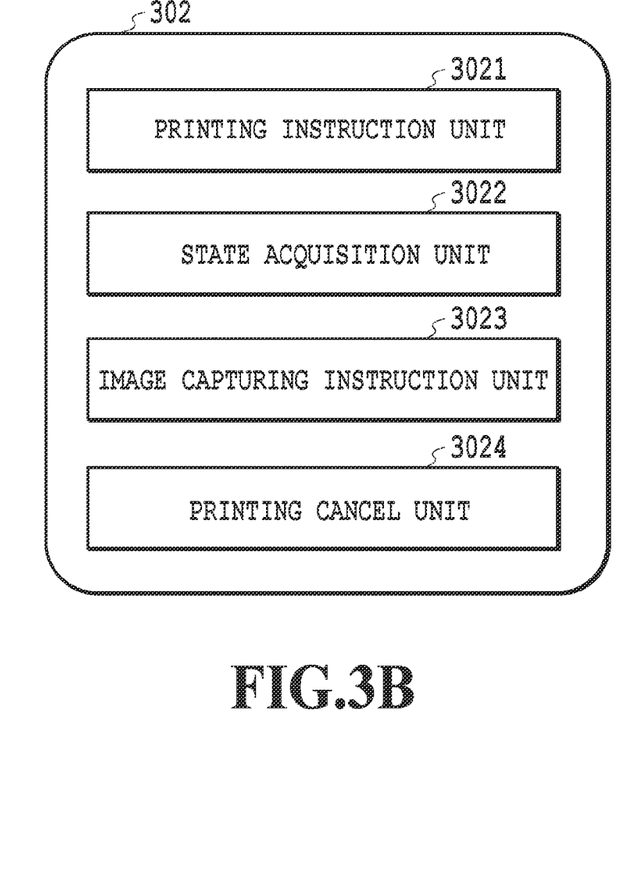

FIG. 3B is a block diagram showing a detailed function configuration of the printer control unit 302. Each unit shown in FIG. 3B is implemented by the CPU 201 executing programs stored in the ROM 202. A printing instruction unit 3021 gives instructions to perform blank sheet printing (discharge of a document) to the printer 102 in which a document is set in the sheet feed unit. The printer 102 having received the instructions discharges the document without performing printing processing for the document set in the sheet feed unit. The instructions to perform blank sheet printing (instructions to discharge a sheet) are implemented by the mobile terminal transmitting a blank sheet job. A state acquisition unit 3022 acquires the state of the printer 102 by communicating with the printer 102. An image capturing instruction unit 3023 detects timing at which the printer 102 discharges the document based on the state of the printer 102 acquired by the state acquisition unit 3022 and transmits image capturing instructions to the image capturing processing unit 303, to be described later, at the timing. Further, a printing cancel unit 3024 determines whether or not all the documents have been discharged based on the state of the printer 102 acquired by the state acquisition unit 3022 and in the case of determining that all the documents have been discharged, gives instructions to cancel printing to the printer 102.

The image capturing processing unit 303 receives the image capturing instructions from the printer control unit 302 and captures an image of the document by operating the image capturing unit 205 and saves image data generated by the image capturing unit 205 in the ROM 202.

An operation processing unit 304 processes user input information delivered from the operation unit 206. A display processing unit 305 performs output processing of an image and text data that are displayed on the display unit 207.

Figure 4:
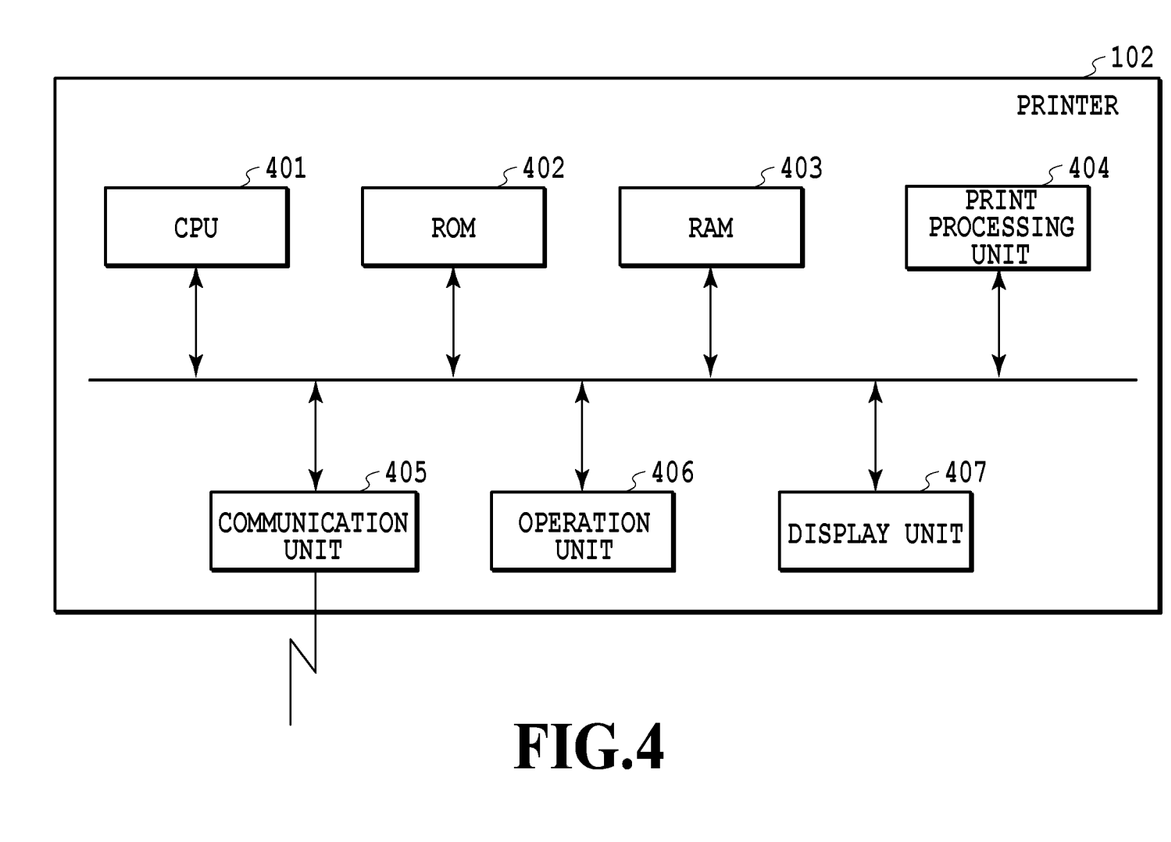
FIG. 4 is a block diagram showing a hardware configuration of a printer according to the embodiment.

FIG. 4 is a diagram showing a hardware configuration of the printer 102 according to the present embodiment. A CPU 401 is a central processing unit configured to control the entire printer 102. Various programs and fixed data for communication, printing, etc., are stored in a ROM 402. Further, a RAM 403 is used to temporarily save data or to read a program.

A print processing unit 404 includes an ink jet or laser print engine and performs printing processing based on print data for a printing medium. A communication unit 405 enables communication with other communication devices, such as the mobile terminal 101, via wired/wireless communication. As the communication system, it is possible to use wireless communication, such as Wi-Fi Direct, Bluetooth (registered trademark), Bluetooth Low Energy (registered trademark), and IEEE802.11, and wired communication, such as IEEE802.3.

The CPU 401 performs communication with the mobile terminal 101 via the communication unit 405, processing of user input information received by an operation unit 406, and output processing of a display image to the display unit 407. Here, communication with the mobile terminal 101 is performed in accordance with a control protocol determined between the mobile terminal 101 and the printer 102 as described previously.

Figure 5:
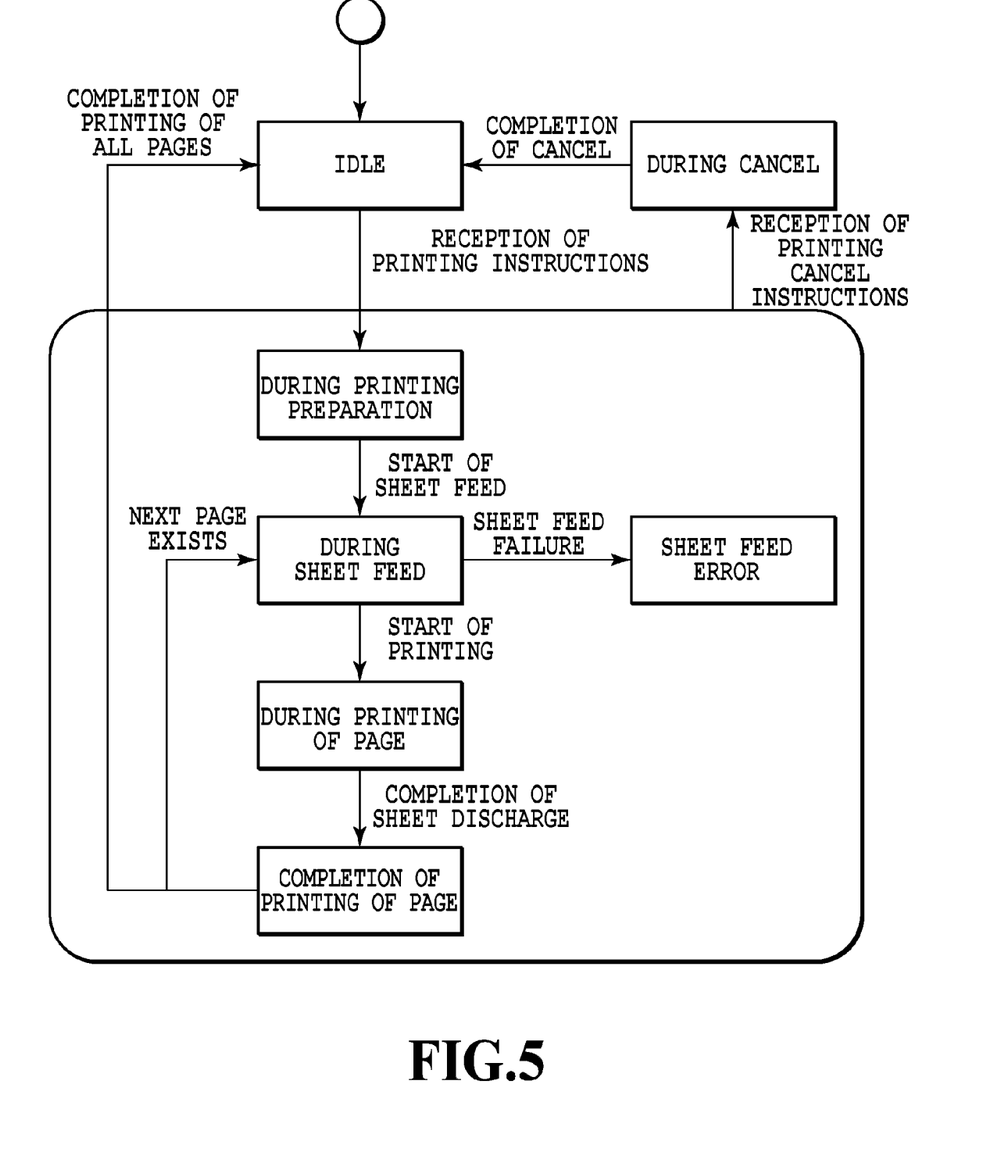
FIG. 5 is a diagram showing a state transition of the printer in printing processing.

FIG. 5 is a diagram showing an example of a state transition of the printer 102 in printing processing. The initial state of the printer 102 is "IDLE". The "IDLE" state indicates that the printer 102 can be made use of but that printing instructions are not given.

Upon receipt of printing instructions from the mobile terminal 101, the printer 102 makes a transition into a "DURING PRINTING PREPARATION" state. The printer 102 performs printing preparation in this state, such as suction of ink. On the completion of printing preparation, the printer 102 starts sheet feed to perform printing and makes a transition into a "DURING SHEET FEED" state.

In the case where the printer 102 has succeeded in sheet feed, the printer 102 makes a transition into a "DURING PRINTING OF PAGE" state and the printer 102 performs printing based on print data included in the printing instructions for the fed printing medium. In the case where a blank sheet job has been received as print data, the printer 102 does not perform actual printing. In the case where the sheet feed has failed, the state of the printer 102 makes a transition into a "SHEET FEED ERROR" state.

After the state of the printer 102 has made a transition into "DURING PRINTING OF PAGE", the printer 102 makes a transition into a "COMPLETION OF PRINTING OF PAGE" state at timing at which printing of data and sheet discharge are completed by the printer 102. In the case where instructions to print a plurality of pages are given, the printer 102 resumes sheet feed and makes a transition into the "DURING SHEET FEED" state. On the completion of printing of all the specified pages, the printer 102 returns to the "IDLE" state.

Further, upon receipt of printing cancel instructions in a state other than the "IDLE" state, the printer 102 makes a transition into a "DURING CANCEL" state. In this state, the printer 102 performs cancel processing, such as deleting received print data and cancelling an error display. After the printer 102 completes the cancel processing, the state of the printer 102 returns to the "IDLE" state.

Figure 6:
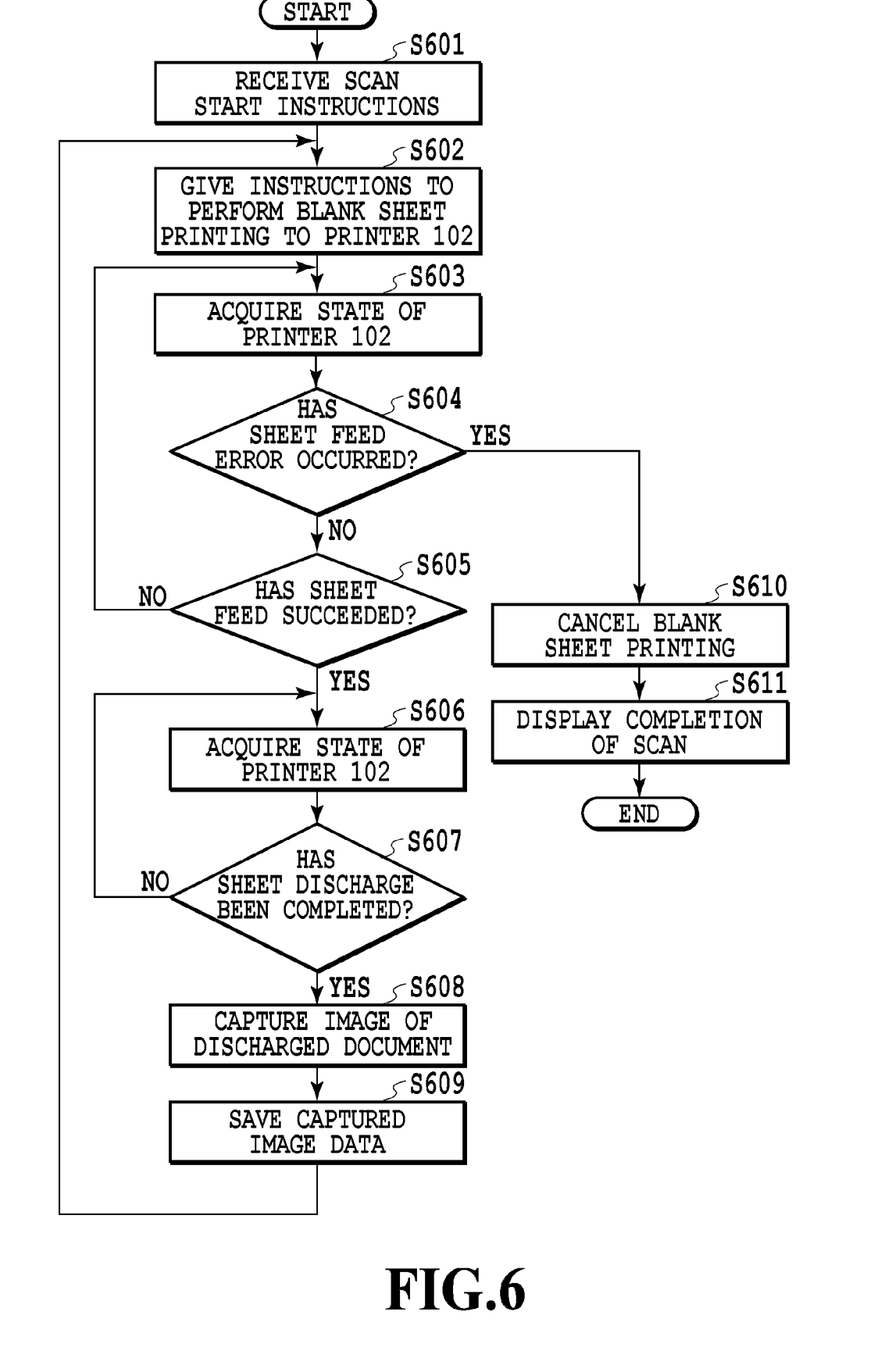
FIG. 6 is a flowchart showing a flow of processing of the mobile terminal according to the embodiment.

In the present embodiment, an example is explained in which a scan is implemented by the mobile terminal 101 transmitting a blank sheet job to the printer 102 and then, by the mobile terminal 101 detecting timing at which the printer 102 discharges a document based on the blank sheet job and capturing an image of the document in the information processing system shown in FIG. 1. It is assumed that the mobile terminal 101 and the printer 102 can communicate with each other by direct communication and in the present embodiment, Wi-Fi Direct communication is established between the mobile terminal 101 and the printer 102 and both are in the state where wireless communication is possible with each other. FIG. 6 is a flowchart showing a flow of processing of the mobile terminal 101 in the present embodiment. The series of processing is implemented by the CPU 201 of the mobile terminal 101 reading a program stored in the ROM 202 or the like onto the RAM 203 and executing the read program.

At step S601, the operation processing unit 304 receives scan start instructions from a user via the operation unit 206. In this stage, it is common for the user to have already set a document to be scanned in the printer 102 by using the mobile terminal 101.

At step S602, the printing instruction unit 3021 in the printer control unit 302 transmits a blank sheet job to the printer 102 by communicating with the printer 102 via the communication processing unit 301 in accordance with a control protocol. In the present embodiment, it is assumed that XML data is transmitted and received via UDP communication as a specific control protocol. It is assumed that the XML data that is transmitted by the mobile terminal 101 as printing instructions includes blank sheet data including 1 as the number of sheets to be printed and only white pixels as image data for printing. Further, it is assumed that the XML data that is transmitted from the printer 102 as a response includes a job ID associated with the printing instructions of the mobile terminal 101.

At step S603, the state acquisition unit 3022 in the printer control unit 302 acquires the state of the printer 102 by communicating with the printer 102 via the communication processing unit 301 in accordance with a control protocol. In the present embodiment, it is assumed that the state of the printer 102 is acquired by performing transmission and reception of XML data via UDP communication as a specific control protocol.

At step S604, the printing cancel unit 3024 in the printer control unit 302 refers to the state of the printer 102 acquired at step S603 and determines whether or not a sheet feed error has occurred. Specifically, the printing cancel unit 3024 determines that a sheet feed error has occurred in the case where the state of the printer 102 is the "SHEET FEED ERROR" state and advances the processing to step S610. In the case where the state of the printer 102 is not the "SHEET FEED ERROR" state, the printing cancel unit 3024 determines that no sheet feed error has occurred and advances the processing to step S605.

At step S605, the printing cancel unit 3024 in the printer control unit 302 refers to the state of the printer 102 acquired at step S603 and determines whether or not the printer 102 has succeeded in the sheet feed. Specifically, the printing cancel unit 3024 determines that the printer 102 has succeeded in the sheet feed in the case where the state of the printer 102 is the "DURING PRINTING OF PAGE" state and advances the processing to step S606. In the case where the state of the printer 102 is not the "DURING PRINTING OF PAGE" state, the printing cancel unit 3024 determines that the printer 102 has not succeeded in the sheet feed and returns the processing to step S603. In this manner, the printer control unit 302 repeats the processing at steps S603 to S605 until the printing cancel unit 3024 determines that the printer 102 has succeeded in the sheet feed and advances the processing to step S606 after checking that the printer 102 has succeeded in the sheet feed.

At step S606, the state acquisition unit 3022 in the printer control unit 302 acquires the state of the printer 102 by the same method as that at step S603. At step S607, the image capturing instruction unit 3023 in the printer control unit 302 refers to the state of the printer 102 acquired at step S606 and determines whether or not the printer 102 has completed sheet discharge. Specifically, the image capturing instruction unit 3023 determines that the printer 102 has completed the sheet discharge in the case where the state of the printer 102 is the "COMPLETION OF PRINTING OF PAGE" state (state where printing for each page is completed) and advances the processing to step S608. In the case where the state of the printer 102 is not the "COMPLETION OF PRINTING OF PAGE" state, the image capturing instruction unit 3023 determines that the printer 102 has not completed the sheet discharge and returns the processing to step S606. In this manner, the printer control unit 302 repeats the processing at steps S606 and S607 until the image capturing instruction unit 3023 determines that the printer 102 has completed the sheet discharge and advances the processing to step S608 after checking that the printer 102 has completed the sheet discharge.

At step S608, the image capturing instruction unit 3023 in the printer control unit 302 gives instructions to capture an image of the discharged document to the image capturing processing unit 303. The image capturing processing unit 303 having received the instructions captures an image of the document via the image capturing unit 205 and saves acquired image data in the RAM 203. As described above, by capturing an image of the document after checking that the printer 102 is in the "COMPLETION OF PRINTING OF PAGE" state, even in the case where the sheet discharge is delayed because cleaning processing or the like of the printer 102 is performed during printing, it is possible to capture an image of a document at accurate timing.

Further, there is a case where distortion or the like occurs in image data as the results of image capturing depending on the image capturing position of the image capturing unit 205 configured to capture an image of a discharged document. Consequently, at S608, it may also be possible for the image capturing processing unit 303 to modify the image data by performing image correction processing, such as trapezoid correction. As a method of performing trapezoid correction, for example, it is considered to use projection conversion publicly known. In the projection conversion, after a conversion coefficient is calculated by analyzing pixels forming an edge of a document included in image data, the position of each pixel after conversion is determined based the conversion coefficient.

Further, in the case where the mobile terminal 101 is held by a holding member and the mobile terminal 101 captures images of all pages from the same position, in the image correction processing at step S608, it may also be possible to apply the processing for an image of the first page to the subsequent pages. For example, in the trapezoid correction using projection conversion, the conversion coefficient that is used for projection conversion is calculated by analyzing the image data for the image of the first page. For the images of the second page and subsequent pages, it may also be possible to use the same conversion coefficient as that of the first page without recalculating a conversion coefficient from the image data. Further, it may also be possible to cause a user to select whether to apply the image correction processing actually. This case can be implemented by the display processing unit 305 displaying the image after the image correction processing on the display unit 207 and by the operation processing unit 304 receiving selection of a user via the operation unit 206.

After this, at step S609, the image capturing processing unit 303 generates an image file including image information based on the image data saved in the RAM 203 at step S608 and saves the image file in the ROM 202. Then, the processing returns to step S602 so that blank sheet printing of the next page is performed.

At step S610, the printing cancel unit 3024 in the printer control unit 302 determines that there is no more document to be scanned because a sheet feed error has occurred. Then, the printing cancel unit 3024 gives instructions to cancel printing to the printer 102 by communicating with the printer 201 via the communication processing unit 301 in accordance with a control protocol. By the printer 102 cancelling blank sheet printing after checking that the printer 102 is in the "SHEET FEED ERROR" state, it is possible to finish the scan at accurate timing without the need to check the number of document pages to be scanned in advance. Then, at step S611, the display processing unit 305 displays that the scan is completed to a user by operating the display unit 207.

Figure 7:
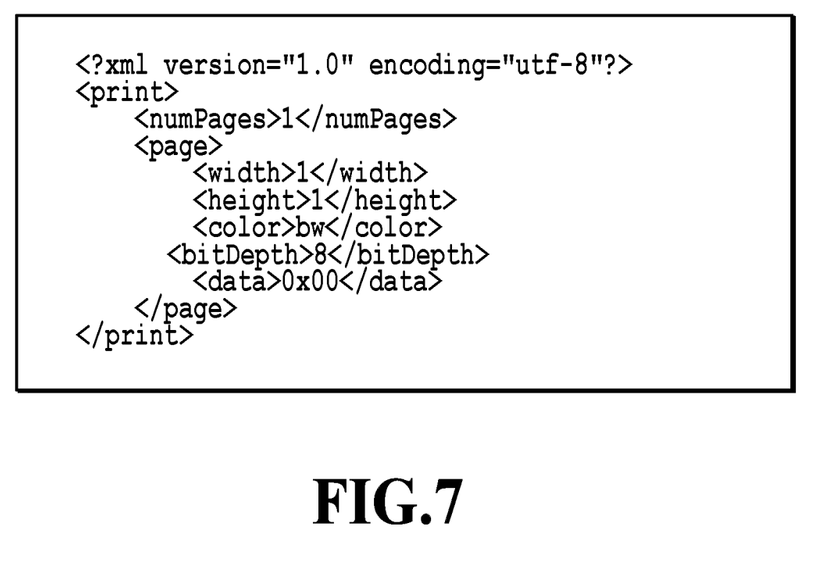
FIG. 7 is a diagram showing an example of printing instructions in the embodiment.

FIG. 7 is a diagram showing an example of printing instructions in the present embodiment and showing an example of XML data that is transmitted based on a control protocol by the printer control unit 302 in order to give instructions to perform blank sheet printing at step S602. In the XML, by a print tag, specific contents of printing instructions are described. A numPages tag is a tag that indicates the number of pages to be printed and in the present embodiment, printing instructions are transmitted for each page, and therefore, the numPages tag indicates here that the number of pages to be printed is one. A page tag is a tag that indicates detailed information relating to each page. A width tag and a height tag are tags that indicate the width and the height, respectively, of print data and in this example, both the tags indicate that the print data is 1 pixel×1 pixel print data. A color tag is information indicating whether print data is color or monochrome data and in this example, the color tag indicates that the print data is monochrome data. A bitDepth tag indicates the number of bits necessary to represent one pixel and in this example, the bitDepth tag indicates that one pixel is represented by eight bits, i.e., by one byte. A data tag is a tag that describes print data and in this example, the data tag indicates that 1-byte blank sheet data is stored as print data.

The method of implementing blank sheet printing is not limited to the above-described method. For example, it may also be possible to use a method in which a dedicated command to perform blank sheet printing is provided as a control protocol in place of implementing blank sheet printing by sending a print job (blank sheet job) including blank sheet data as printing instructions. In this case, a dedicated command is transmitted to the printer 102 as printing instructions to instruct blank sheet printing. Upon receipt of printing instructions, the printer 102 returns a job ID associated with the printing instructions by the mobile terminal 101 as a response. It may also be possible to feed and discharge a document set in the sheet feed unit only by the mobile terminal 101 sending discharge instructions (discharge command) to discharge a document set in the sheet feed unit.

Figure 8:
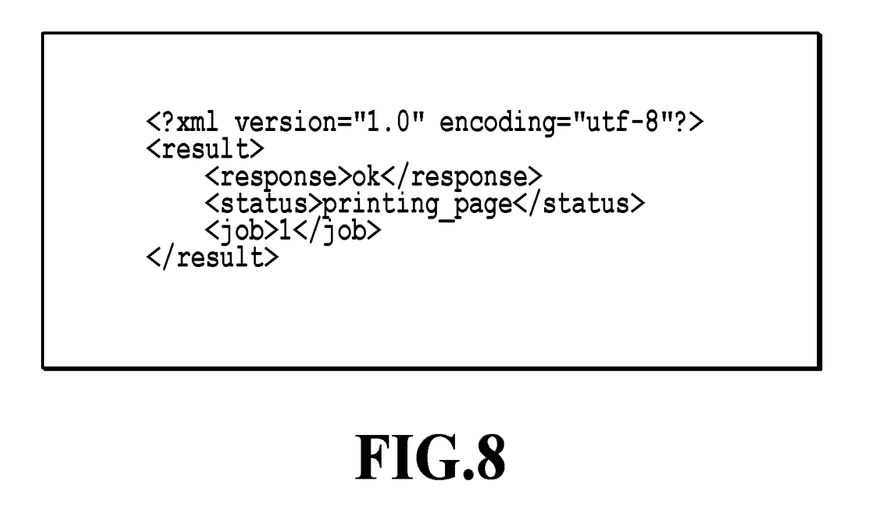
FIG. 8 is a diagram showing an example of a response to a state acquisition request in the embodiment.

FIG. 8 is a diagram showing an example of a response to a state acquisition request in the present embodiment. At steps S603 and S606, the printer control unit 302 issues a state acquisition request to the printer 102 based on a control protocol. An example of XML data returned by the printer 102 as a response to the state acquisition request is shown in FIG. 8. In the XML data, by a response tag, a response to an inquiry is returned and in this example, the response tag indicates that the inquiry has succeeded. Further, a status tag is a tag that represents a state of the printer 102 and one of the states defined in FIG. 5 is returned as a response. In this example, the status tag indicates that the printer 102 is in the "DURING PRINTING OF PAGE" state. Further, a job tag indicates a job ID being processed by the printer 102 and in this example, the job tag indicates that a job whose ID is 1 is being processed.

As above, in the information processing system of the present embodiment, the mobile terminal 101 communicates with the printer 102 so as to acquire the state of the printer 102 during printing processing after the mobile terminal 101 transmits a blank sheet job to the printer 102. That is, it is possible for the mobile terminal 101 to appropriately perform each piece of control in the scan processing by transmitting a state acquisition request to the printer 102, receiving a response to the state acquisition request from the printer 102, and checking the state of the printer 102.

(Modification Examples)

In the above-described embodiment, in the processing explained in the flowchart in FIG. 6, it is assumed that the mobile terminal 101 transmits printing instructions to the printer 102 for each page. That is, at step S602, the printer control unit 302 gives instructions to perform blank sheet printing of one page and after this, each time the captured image of a document is saved at step S609, the processing is returned to step S602 so that blank sheet printing of the next page is performed. However, as another method, it may also be possible to give instructions to perform printing of the number of pages sufficiently large for the number of documents that can be set in the printer 102 at a time, such as giving instructions to perform blank sheet printing of 1,000 pages at step S602. In this case, it is possible to implement the other pieces of processing as in the previously described flow by returning the processing to step S603 after the processing at step S609 is completed.

Further, in the above-described embodiment, in the processing explained in the flowchart in FIG. 6, after the image capturing processing unit 303 captures the image of a discharged document and saves the captured image at steps S608 and S609, the processing is returned to step S602 and instructions to perform blank sheet printing of the next page are given. However, it may also be possible to perform the processing at step S602 before performing the processing at steps S608 and S609. In this case, it is possible to implement the other pieces of processing as in the previously described flow by returning the processing to step S603 after step S609.

Further, in the above-described embodiment, in the processing explained in the flowchart in FIG. 6, determination is performed by checking only the state of the printer 102 at each of steps S604, S605, and S607. However, it may also be possible to perform the determination by additionally determining whether the job ID being processed by the printer 102 coincides with the job ID issued at step S602. In this case, for example, even though the state of the printer 102 is the "DURING PRINTING OF PAGE" state at step S605, on a condition that it is determined that the job ID being processed by the printer 102 is different from the job ID issued at S602, the processing is returned to step S603.

Further, it may also be possible for the printer 102 to discharge all the set documents in the case of detecting that the communication with the mobile terminal 101 is disconnected during the execution of the processing flow shown in FIG. 6.

Further, in the above-described embodiment, the example of the scan is shown, but it may also be possible to implement a copy function in a pseudo manner by making use of scanned data. In this case, it is possible to implement a copy function by creating printing instructions by including image data of each page saved at step S609 by the printer control unit 302 in the XML data as shown in FIG. 7 after the processing at step S610 is completed and by giving instructions to perform printing to the printer 102.

Further, the processing in FIG. 6 may be performed by a scan application installed in the mobile terminal 101.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to capture an image of a document at accurate timing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-085621, filed Apr. 21, 2016, which is hereby incorporated by reference wherein in its entirety.

What is claimed is:

1. A mobile terminal comprising an image capturing unit and capable of communicating with an image forming apparatus in which a document is set in a sheet feed unit, the mobile terminal comprising:
   one or more processors; and
   at least one memory coupled to the one or more processors, the at least one memory having instructions stored thereon which, when executed by the one or more processors, cause the mobile terminal to:
      transmit a discharge instruction to the image forming apparatus;
      acquire a state of the image forming apparatus by communicating with the image forming apparatus;
      determine whether or not the image forming apparatus has completed discharge of the document based on the state of the image forming apparatus acquired by the acquiring; and
      give an instruction to capture an image of the document to the image capturing unit in a case where it is determined that the image forming apparatus has completed the discharge of the document,
   wherein the image capturing unit captures an image of the document, the discharge of which the image forming apparatus has completed based on the given instruction.

2. The mobile terminal according to claim 1, wherein acquiring further includes acquiring the state of the image forming apparatus by transmitting a state acquisition request to acquire the state of the image forming apparatus to the image forming apparatus and by receiving a response to the state acquisition request from the image forming apparatus in accordance with a control protocol determined between the mobile terminal and the image forming apparatus.

3. The mobile terminal according to claim 1, wherein giving the instruction to capture the image of the document further includes detecting timing at which the state of the image forming apparatus enters a state where printing for each page is completed as timing at which the image forming apparatus completes discharging of the document.

4. The mobile terminal according to claim 1, the memory further having stored thereon instructions that, when executed by the processor, cause the processor to:
   transmit a cancel instruction to cancel discharge of the document to the image forming apparatus in a case of detecting that the state of the image forming apparatus is a sheet feed error state.

5. The mobile terminal according to claim 1, the memory further having instructions stored thereon that, when executed by the processor, cause the processor to:
   perform image correction processing including trapezoid correction for image data of the document,
   wherein the performing of the image correction includes using a coefficient calculated for use in the image correction processing for image data of the document of a first page in the image correction processing for image data of the document of second and subsequent pages.

6. The mobile terminal according to claim 1, wherein the discharge instruction includes a print job including blank sheet data consisting of only white pixels.

7. The mobile terminal according to claim 6, wherein the discharge instruction includes an instruction to discharge one page and the discharge instruction is transmitted to the image forming apparatus for each page of the document.

8. The mobile terminal according to claim 6, wherein the discharge instruction includes an instruction to discharge a number of pages larger than a number of pages of the document and the discharge instruction is transmitted to the image forming apparatus at a time.

9. The mobile terminal according to claim 1, wherein the discharge instruction includes a command to feed and discharge the document without performing printing processing at the image forming apparatus.

10. An information processing system comprising an image forming apparatus and a mobile terminal comprising an image capturing unit and capable of communicating with the image forming apparatus in which a document is set in a sheet feed unit, wherein the mobile terminal includes:
one or more processors; and
at least one memory coupled to the one or more processors, the at least one memory having instructions stored thereon which, when executed by the one or more processors, cause the mobile terminal to:
transmit a discharge instruction to the image forming apparatus;
acquire a state of the image forming apparatus by communicating with the image forming apparatus;
determine whether or not the image forming apparatus has completed discharge of the document based on the state of the image forming apparatus acquired by the acquiring; and
give an instruction to capture an image of the document to the image capturing unit in a case where it is determined that the image forming apparatus has completed the discharge of the document,
wherein the image capturing unit captures an image of the document, the discharge of which the image forming apparatus has completed based on the given instruction.

11. A control method in a mobile terminal including an image capturing unit and capable of communicating with an image forming apparatus in which a document is set in a sheet feed unit, the control method comprising:
transmitting a discharge instruction to the image forming apparatus;
acquiring a state of the image forming apparatus by communicating with the image forming apparatus;
determining whether or not the image forming apparatus has completed discharge of the document based on the state of the image forming apparatus acquired by the acquiring; and
giving an instruction to capture an image of the document to the image capturing unit in a case where it is determined that the image forming apparatus has completed the discharge of the document,
wherein the image capture unit captures an image of the document, the discharge of which the image forming apparatus has completed based on the given instruction.

12. The control method according to claim 11, wherein a state of the image forming apparatus is acquired by the mobile terminal transmitting a state acquisition request to acquire the state of the image forming apparatus to the image forming apparatus and by the mobile terminal receiving a response to the state acquisition request from the image forming apparatus in accordance with a control protocol determined between the mobile terminal and the image forming apparatus.

13. The control method according to claim 11, wherein giving an instruction to capture an image of the document further includes detecting timing at which the state of the image forming apparatus enters a state where printing for each page is completed is detected as timing at which the image forming apparatus completes discharging of the document.

14. The control method according to claim 11, wherein the mobile terminal transmits a cancel instruction to cancel discharge of the document to the image forming apparatus in a case of detecting that the state of the image forming apparatus is a sheet feed error state.

15. The control method according to claim 11, wherein the mobile terminal performs image correction processing including trapezoid correction for image data of the document, and
the image correction processing uses a coefficient calculated for use in the image correction processing for image data of the document of a first page in the image correction processing for image data of the document of second and subsequent pages.

16. The control method according to claim 11, wherein the discharge instruction includes a print job including blank sheet data consisting of only white pixels.

17. The control method according to claim 16, wherein the discharge instruction includes an instruction to discharge one page and the discharge instruction is transmitted to the image forming apparatus for each page of the document.

18. The control method according to claim 16, wherein the discharge instruction includes an instruction to discharge a number of pages larger than a number of pages of the document and the discharge instruction is transmitted to the image forming apparatus at a time.

19. The control method according to claim 11, wherein the discharge instruction includes a command to feed and discharge the document without performing printing processing at the image forming apparatus.

* * * * *